United States Patent [19]
Yamada et al.

[11] Patent Number: 5,873,537
[45] Date of Patent: Feb. 23, 1999

[54] CASSETTE FOR MAGNETIC TAPE WITH A REEL LOCKING ASSEMBLY HAVING A RESILIENT COIL LOCK-ENGAGEMENT MEMBER

[75] Inventors: Takuji Yamada; Yukiyoshi Ishii, both of Kanagawa, Japan

[73] Assignee: Fuji Photo Film Co., Ltd., Kanagawa, Japan

[21] Appl. No.: 627,924

[22] Filed: Apr. 3, 1996

[30] Foreign Application Priority Data

Apr. 7, 1995 [JP] Japan .................................. 7-085970

[51] Int. Cl.⁶ .................................................. G03B 23/02
[52] U.S. Cl. .................. 242/343.2; 242/343; 242/338.3; 242/343.1
[58] Field of Search ............................. 242/343.2, 338.2, 242/343, 343.1, 338.1; 360/132

[56] References Cited

U.S. PATENT DOCUMENTS

| | | | |
|---|---|---|---|
| 4,623,105 | 11/1986 | Pertzsch et al. | 242/338.3 |
| 4,635,879 | 1/1987 | Sumida et al. | 360/132 X |
| 4,703,384 | 10/1987 | Kawada et al. | 242/338.3 |
| 5,351,941 | 10/1994 | Hwang | 360/132 X |
| 5,433,396 | 7/1995 | Kusumi et al. | 242/338.1 |
| 5,433,398 | 7/1995 | Sawada | 242/343.2 |
| 5,506,739 | 4/1996 | Iwahashi | 360/132 |

*Primary Examiner*—Daniel P. Stodola
*Assistant Examiner*—Gregory J. Strimbu
*Attorney, Agent, or Firm*—McAulay Nissen Goldberg Kiel & Hand, LLP

[57] ABSTRACT

A cassette for magnetic tape includes a pair of cassette halves cooperating with each other to form a cassette body; a pair of reels disposed rotatably in one of the cassette halves to wind the magnetic tape around the reels, each of the reels including a flange having a plurality of teeth formed at a circumference of the flange; and a reel locking assembly engaging the flanges for preventing rotation of the reels, the reel locking assembly includes: a slide body slidably disposed between the reels for sliding movement in a front-rear direction of the cassette body; an urging member urging the slide body towards a front of the cassette body; a pair of support members each disposed on a respective side of the slide body; and a pair of lock-engagement members, each having a central portion which is supported rotatably by a respective one of the support members, the lock-engagement members being made of a resilient spring wire rod. Each of the lock-engagement members further includes a first engagement end engaged to the slide body and a second engagement end which is enabled to engage the teeth of one of the flanges when the slide body is positioned towards the front of the cassette body.

4 Claims, 4 Drawing Sheets

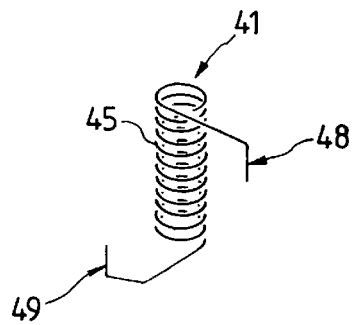
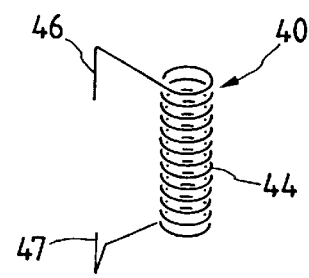
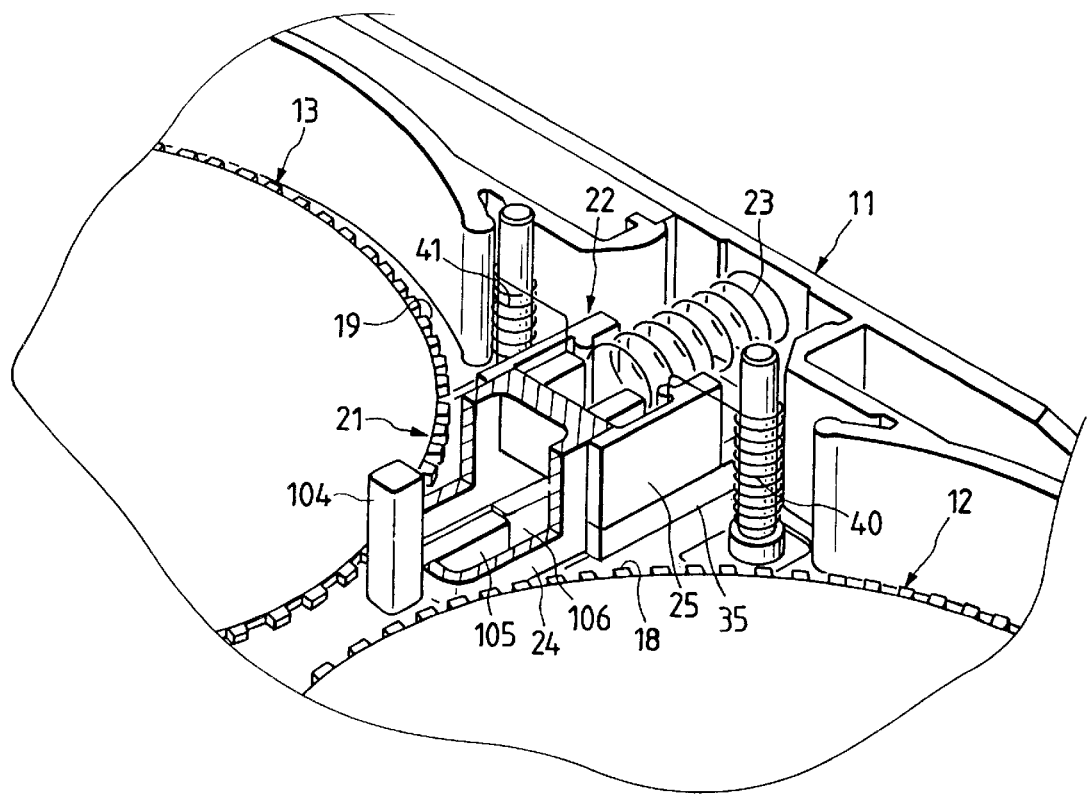

CASSETTE FOR MAGNETIC TAPE WITH A REEL LOCKING ASSEMBLY HAVING A RESILIENT COIL LOCK-ENGAGEMENT MEMBER

BACKGROUND OF THE INVENTION

1. Field of the Invention

The present invention relates to a cassette for containing a magnetic tape cassette to be used preferably for a video tape cassette, and more particularly to such a cassette capable of preventing engagement members of a reel locking device from being deteriorated to make it possible to certainly lock reels, and also capable of decreasing the number of parts constituting the reel locking device.

2. Description of the Related Art

FIG. 1 illustrates an inside structure of a conventional cassette for containing a magnetic tape (hereinafter, referred to as "magnetic tape cassette). A video tape cassette 5 comprises a cassette half 51 (an upper cassette half is removed for clarity, and hence only a lower cassette half is illustrated in FIG. 1) in which a pair of reels 52 and 53 are disposed for rotation. Around each of the reels 52 and 53 is wound a magnetic tape 54. The magnetic tape 54 is guided by tape guides 55 and 56 disposed in the vicinity of a front (an upper side in FIG. 1) and at opposite sides of the cassette 5 so that the magnetic tape 54 passes along an opening 57 formed in the vicinity of the front of the cassette half 51. The reels 52 and 53 are formed with lower flanges 58, 59 which are formed at a whole perimeter thereof with teeth 60 and 61, respectively.

There is disposed a lock member 62 which is disposed in an almost triangular space located in the vicinity of a rear of the cassette 5 and between the pair of the reels 52 and 53, and which acts as a reel locking device for preventing the reels 52 and 53 from rotating in order not to loosen the wound magnetic tape 54 in transportation and handling thereof while the video tape cassette 5 is not being loaded in a video deck (not illustrated).

The conventional lock member 62 is formed with almost triangular shaped ribs 80 and 81 between a rear plate 63 of the cassette half 51 and the pair of reels 52, 53. The ribs 80 and 81 have straight portions 65 and 66 extending in a front-rear direction of the cassette half and parallel to each other, and an engagement member 67 is slidably interposed between the straight portions 65 and 66. A compressed spring 68 disposed between the rear plate 63 and the engagement member 67 exerts pushing force on the engagement member 67 towards the front of the cassette half. The engagement member 67 is formed at a bottom surface thereof with an opening 69 through which a lock-releasing pin of a video deck is to be inserted. The cassette half 51 is formed at a bottom surface 70 thereof with an opening (not illustrated) located in alignment with the opening 69 of the engagement member 67.

The engagement member 67 is suitably made of elastic resin, and has a rectangular-shaped slide body 71 having a relatively wide bottom surface area for stable slide movement, as illustrated in FIG. 2. The slide body 71 is integrally formed at a front end surface thereof with a pair of engagement claws 72 and 73 which are engagable to the teeth 60 and 61 formed with the reels 52 and 53, respectively.

The engagement claws 72 and 73 are designed to be relatively long and to have thin hinge portions 74 and 75, respectively, at the proximal ends of the engagement claws 72 and 73, that is, at joint portions connecting the engagement claws 72 and 73 to the slide body 71. Thus, the engagement claws 72 and 73 are able to elastically and transversely swing as shown with arrows A in FIG. 2. As illustrated in FIG. 2, a guide member such as pins 90 are disposed on the cassette half 51 in a projecting fashion. The pins 90 ensure that the engagement claws 72 and 73 open relative to each other to engage to the teeth 60 and 61 for locking the reels 52 and 53 as the slide body 71 makes slide movement towards the front of the cassette half, and that the engagement claws 72 and 73 close relative to each other or move towards each other to move away from the teeth 60 and 61 for releasing lock of the reels as the slide body 71 makes slide movement towards the rear of the cassette half. The magnetic tape cassette having the reel locking device as mentioned above is suggested, for instance, in Unexamined Japanese Patent Publication No. 7-14342.

On the other hand, there has been suggested another magnetic tape cassette 8 as illustrated in FIG. 3 in which engagement portions 200 and 201 are prepared separately from a slide body 202, and are secured to a cassette half 83 for rotation. The engagement portions 200 and 201 are maintained to be pushed towards the reels 85 and 86 by a spring 84. For instance, refer to Unexamined Japanese Patent Publication No. 6-44733.

When the video tape cassette 8 is not being loaded into a video deck, the slide body 202, which is designed to be slidable by a suitable guide member in a front-rear direction of the cassette, is pushed by a compressed spring 87 to the foremost movement location. In this stage, the engagement claws 88 and 89 are guided to insert into the adjacent teeth 95 and 96, respectively, so that the reels 85 and 86 are surely locked.

When the video tape cassette 8 is loaded into a video deck, the slide body 202 retreats with the result that engagement members 92 and 93 of the engagement portions 200 and 201 are pushed by the slide body 202 towards the rear of the cassette. Thus, the engagement portions 200 and 201 are made to rotate in clockwise and counterclockwise directions, respectively, and hence the engagement claws 88 and 89 are made to come out of engagement with the teeth 95 and 96, resulting in that lock of the reels 85 and 86 are released.

In the former video tape cassette 5, the engagement claws 72 and 73 are designed to be elongated and to have the hinge portions 74 and 75 by forming the proximal ends of the engagement claws 72 and 73 to be thin so that the engagement claws 72 and 73 of the engagement member 67 of the lock member 62 are transversely swingable. Thus, the hinges 74 and 75 are often fatigued when the video tape cassette 5 falls on a floor or by long term use, for instance, so that the engagement claws 72 and 73 would be broken at the hinge portions 74 and 75 or would be deformed plastically with the result of uncertain lock of the reels 52 and 53.

On the other hand, in the latter video tape cassette 8, the magnetic tape cassette has to have a greater number of parts since the engagement portions are formed separately from the slide body, and the spring 84 has to be prepared for urging the engagement portions 200 and 201 toward the reels. In addition, the video tape cassette 8 has much complexity in assembling thereof. In particular, each of parts has to be small in a small-sized magnetic tape cassette. Thus, if there are a great number of parts, the assembling of the cassette unpreferably takes too much time and labor. The above mentioned problem also arises in various types of magnetic tape cassettes as well as the video tape cassettes 5 and 8.

SUMMARY OF THE INVENTION

In view of problems of conventional magnetic tape cassettes, the present invention has an object to provide a magnetic tape cassette capable of surely locking reels, ensuring stable lock of reels even in long term use, decreasing the number of assembly parts, and being readily assembled.

The present invention provides a cassette for magnetic tape which includes a pair of cassette halves cooperating with each other to form a cassette body; a pair of reels disposed rotatably in one of the cassette halves to wind a magnetic tape around the respective reels, each of the reels including a flange having a plurality of teeth formed at its circumference; and a reel locking assembly engaging the flange for preventing rotation of the reels, in which the reel locking assembly includes: a slide body disposed between the reels slidably in a front-rear direction of the cassette body; an urging member urging the slide body towards a front of the cassette body; a support member disposed near left and right sides of the slide body; and a lock-engagement member having a central portion which is supported rotatably by the support member along a plane of the cassette body, the lock-engagement member being made of metal having resiliency. The lock-engagement member further includes a first engagement end engaged to the slide body and a second engagement end which is enabled to engage the teeth of the flange with the slide body being positioned at its foremost movement position.

In a preferred embodiment, the slide body is formed with an elongated hole extending in a slide direction thereof, the one of engagement ends being to be inserted into the elongated hole for slide movement so as to delay starting rotation of the lock-engagement members on retreat movement of the slide body.

In another preferred embodiment, each of the lock-engagement members is wound at least once at a central portion thereof like a coil to form a hole, and each of the supporters comprise a shaft which is to be inserted into the hole.

In still another preferred embodiment, the engagement ends of the lock-engagement members have the same configuration.

In a cassette for magnetic tape provided in accordance with the present invention, the slide body is urged toward the reels by an urging member when the magnetic tape cassette is not being loaded in a cassette deck. One of the engagement ends of the lock-engagement members rotatably disposed in the cassette half is pushed forwardly by the slide body, and thus the other of the engagement ends is made to be inserted into the teeth of the reels, so that the reels are locked. Since the lock-engagement members are made of metal having resiliency, it is possible to prevent the engagement ends from being fatigued or deteriorated while ensuring lock of the reels. In addition, since the engagement members have resiliency, it is no longer necessary to prepare a spring for urging the engagement members toward the reels, so that the number of parts are decreased.

When the magnetic tape cassette is loaded in a cassette deck, the slide body is pushed by a lock releasing pin of the cassette deck to retreat, and thus the lock-engagement members rotate in a direction away from the reels. Thus, the other of the engagement ends of the lock-engagement members are made to come out of engagement with the teeth of the reels, so that the lock of the reels is released.

The slide body has an elongated hole extending in a front-rear direction of the cassette, in which hole is to be engaged one of the engagement members of the lock-engagement members. Thus, when the engagement ends slide in the elongated hole and thus the slide body retreats by a certain distance, the lock-engagement members start to rotate. Accordingly, when a certain period of time passes after the magnetic tape cassette has been loaded in a cassette deck, the lock of the reels is released, which can prevent the magnetic tape from being loosened while the magnetic tape is being loaded.

By designing the engagement ends of the lock-engagement members to be the same in shape, it is no longer necessary to pay attention with respect to upper or lower side and left or right side of the lock-engagement members, when the lock-engagement members are inserted into shafts of the cassette half. Thus, it is possible to decrease the number of assembly parts, and also possible to easily assemble. In addition, by winding the lock-engagement members at least once at a central portion thereof like a coil to form a hole, it is possible to maintain the resiliency to be high even if the lock-engagement members are small in size.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIGS. 8A and 8B are perspective views of lock-engagement members; and

FIG. 9 is a perspective view of a lock member positioned in place with certain parts omitted for the sake of clarity.

DESCRIPTION OF THE PREFERRED EMBODIMENTS

With reference to FIGS. 4 to 9, hereinbelow will be described a preferred embodiment in which a magnetic tape cassette made in accordance with the present invention is applied to a video tape cassette.

Figure 4:
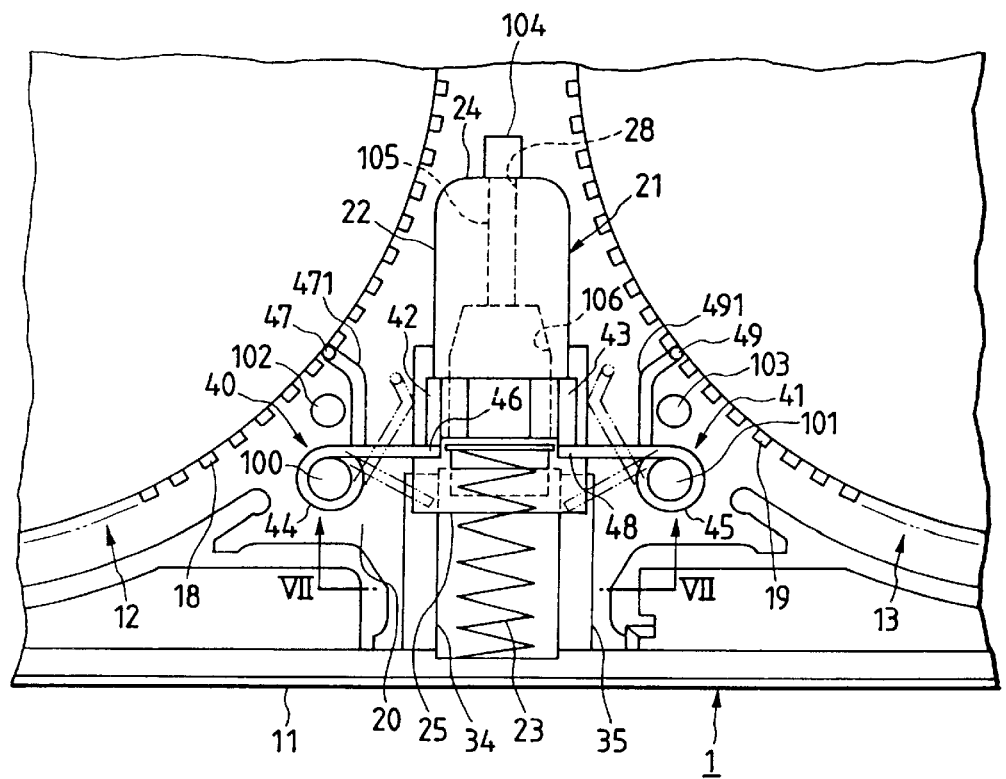
FIG. 4 is a plan view of a part of a video tape cassette to which a magnetic tape cassette made in accordance with the present invention is applied.

As illustrated in FIG. 4, a video tape cassette 1 made in accordance with the invention comprises a cassette half 11 (an upper cassette half is removed for the sake of clarity, and hence only a lower cassette half is illustrated in FIG. 4) in which a pair of reels 12 and 13 are disposed for rotational movement. Around each of the reels 12 and 13 is wound a magnetic tape (not illustrated). The reels 12 and 13 each have lower flanges with teeth around their entire perimeter, 18 and 19, respectively.

Figure 1:
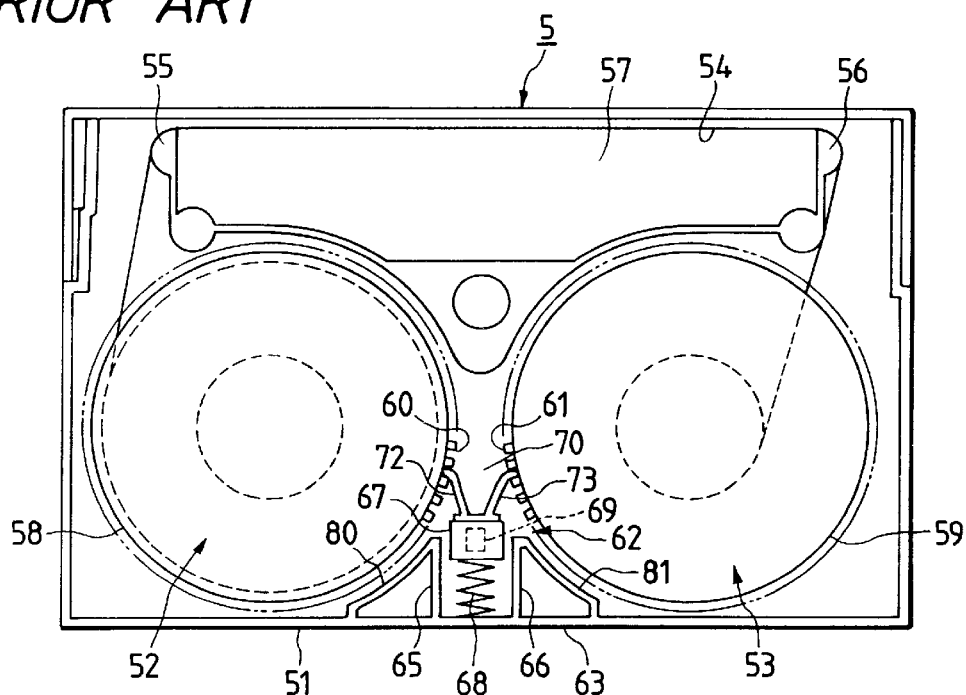
FIG. 1 is a plan view of a conventional video tape cassette with an upper cassette half thereof being removed for clarity.
Figure 2:
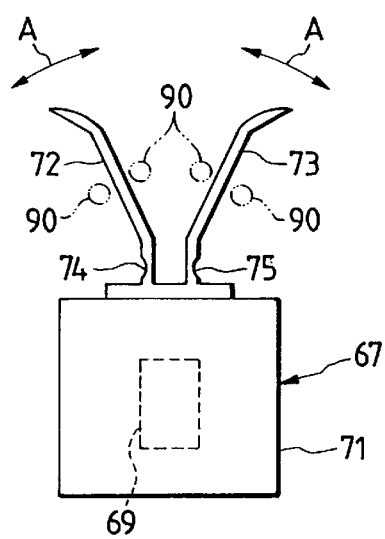
FIG. 2 is an enlarged view of a part of the video tape cassette illustrated in FIG. 1.
Figure 3:
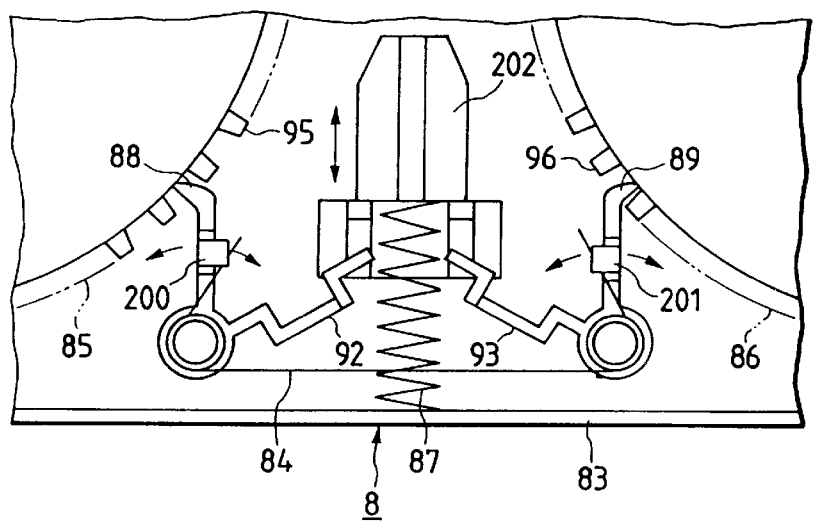
FIG. 3 is an enlarged view of a part of another conventional video tape cassette.

There is disposed a lock member 21 which is disposed in an almost triangular space 20 located in the vicinity of a rear of the video tape cassette 1 and between the pair of the reels 12 and 13, and which acts as a reel locking device for preventing the reels 12 and 13 from rotating in order not to loosen the wound magnetic tape while the video tape cassette 5 is not being loaded in a video deck (not illustrated). Parts other than the lock member 21 have the same function as those of the conventional video tape cassette 5 having been described with reference to FIG. 1, and hence explanation about them is omitted.

Figure 5:
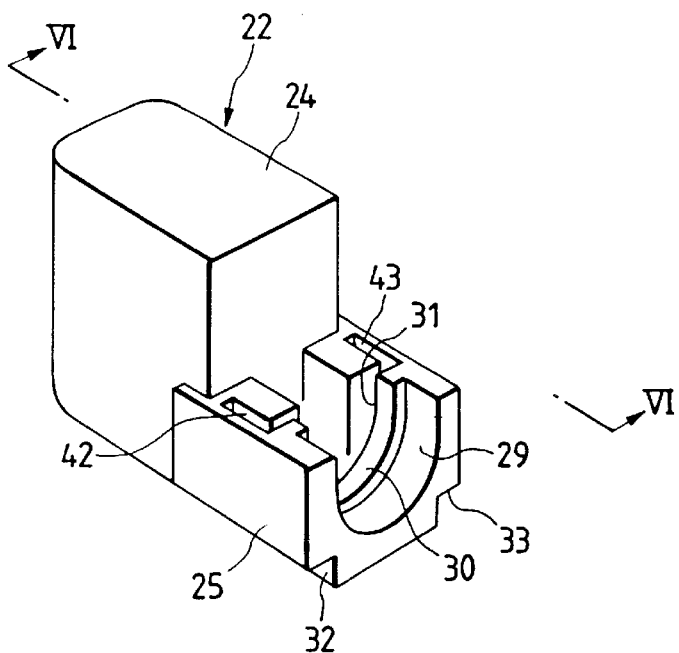
FIG. 5 is a perspective view of a slide body.
Figure 6:
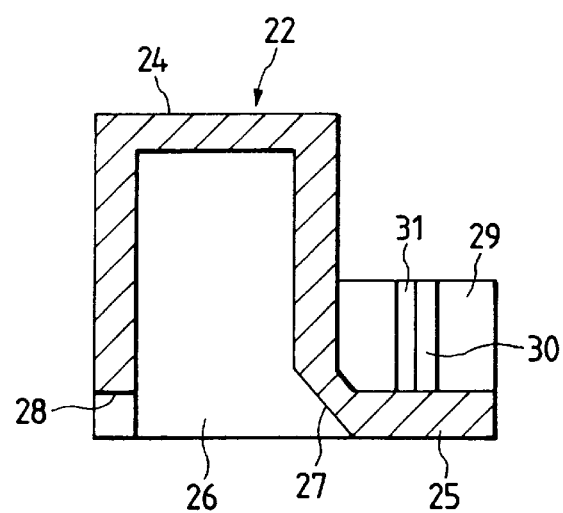
FIG. 6 is a cross-sectional view taken along the line VI—VI in FIG. 5.

The lock member 21 comprises a slide body 22 disposed for slide movement between the pair of the reels 12 and 13, a compressed spring 23 for urging the slide body 22 towards the reels 12 and 13, and lock-engagement members 40 and 41 disposed at the either side of the slide body 22. As illustrated in FIG. 5, the slide body 22 is formed with a hollow portion 24 into which a lock releasing pin is to be inserted, and further with a guide portion 25 at the rear of the hollow portion 24. As illustrated in FIG. 6, the hollow portion 24 is shaped in a relatively deep dome. There is formed an inclined surface 27 at a bottom of an opening 26 at a rear end of the hollow portion. The hollow portion 24 has a relatively small width so that it can enter a space present between the pair of the reels 12 and 13.

As later explained, when the video tape cassette 1 is loaded in a video deck, a lock releasing pin (not illustrated) of a video deck pushes the inclined surface 27 to thereby cause the slide body 22 to retreat, so that the reels 12 and 13 are released from being locked. The hollow portion 24 is designed to have a length so that the lock releasing pin does not abut a front end of the slide body when the slide body 22 retreats by a certain distance, namely until the reels 12 and 13 are released from being locked. There is formed a guide groove 28 having a predetermined width at the center of a front wall of the hollow portion 24.

As illustrated in FIG. 5, the guide portion 25 is formed a U-shaped recess 29 which is open upwardly for containing an end of the compressed spring 23. Wholly along an inner surface of the U-shaped recess 29 is formed a projecting rib 30. Adjacent to the projecting rib 30 is formed an engagement groove 31 into which an end of the compressed spring 23 is to be fixed.

Figure 7:
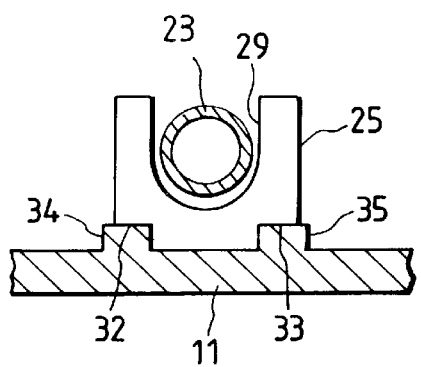
FIG. 7 is a cross-sectional view taken along the line VII—VII in FIG. 5.

The guide portion 25 is formed at an upper surface thereof with engagement holes 42 and 43 to which one of the engagement ends of the lock-engagement members 40 and 41 are inserted. The engagement holes 42 and 43 are designed to be elongated holes extending in a direction in which the slide body 22 makes slide movement. As illustrated in FIGS. 5 and 7, the guide portion 25 is formed at a bottom surface and at opposite sides thereof with guide grooves 32 and 33. The guide grooves 32 and 33 are to be fit into guide rails 34 and 35 formed on the cassette half 11, respectively, so that the slide body 22 slides linearly only in a front-rear direction of the cassette.

As illustrated in FIGS. 8A and 8B, the lock-engagement members 40 and 41 are made of spring wire rod composed of metal having certain resiliency such as SUS 304, and include coil portions 44 and 45, respectively. Opposite ends of the coil portions 44 and 45 are inwardly bent to define engagement ends 46, 47, 48 and 49. The upper engagement ends 46 and 48 are L-shaped. The lock-engagement members 40 and 41 are formed with bending portions 471 and 491 (see FIG. 4) between the lower engagement ends 47, 49 and the coil portions 44, 45 for facilitating insertion of the lower engagement ends 47, 49 into the teeth 18, 19.

The spring wire rod constituting the lock-engagement members has a diameter in the range of 0.2 mm to 0.8 mm, preferable in the range of 0.3 mm to 0.6 mm. The number of winding the spring wire rod in the coil portions 44 and 45 is at least one, preferably in the range of 4 to 20, and more preferably in the range of 8 to 18.

When a relatively thick spring wire rod (for instance, a rod having a diameter of 0.8 mm) is to be used, if an interval between the adjacent teeth of the reels is smaller (for instance, 0.5 mm) than the diameter of the spring wire rod, the engagement ends 47 and 49 are formed to be flat.

As illustrated in FIG. 4, there are disposed standing shafts 100 and 101 as a support member in the vicinity of the guide rails 34 and 35. The coil portions 44 and 45 of the lock-engagement members 40 and 41 are placed over the shafts 100 and 101, respectively. The upper engagement ends 46 and 48 are engaged to the elongated holes 42 and 43 of the slide body 22, respectively so that the upper engagement ends 46 and 48 are able to move by a certain distance. In front of the standing shafts 100 and 101 stand stopper pins 102 and 103 which restricts movement of the lower engagement ends 47 and 49 of the lock-engagement members 40 and 41.

As best shown in FIG. 9, the cassette half 11 is formed with a square pole shaped stopper 104 for restricting advance movement of the slide body 22. The lower engagement ends 47 and 49 of the lock-engagement members 40 and 41 are inserted between the teeth 18 and 19 of the reels by more than a certain distance with the slide body 22 being kept in abutment with the stopper 104, so that the reels 12 and 13 are surely locked. There is formed a linear-shaped guide projection 105 at the rear of the stopper 104.

The guide projection 105 is inserted into the guide recess 28 formed at the hollow portion 24 of the slide body 22. Thus, a front end of the hollow portion 24 is able to linearly move. In addition, there is formed a pin insertion opening 106 at the rear of the guide projection 105 in alignment with the hollow portion 24 of the slide body 22. A lock releasing pin of a video deck is to be inserted into the hollow portion 24 of the slide body 22 through the pin insertion opening 106.

With reference to FIG. 4, hereinbelow will be explained the operation of the lock member 21. Since a lock releasing pin of a video deck is not inserted into the hollow portion 24 of the slide body 26 when the video tape cassette 1 is being taken out of the video deck, the slide body 22 is compressed to the stopper 104 disposed in front thereof by a pushing force exerted by the compressed spring 23.

In this situation, the lower engagement ends 47 and 49 of the lock-engagement members 40 and 41 are being inserted between the adjacent teeth 18 and 19 of the reels 12 and 13, so that the reels 12 and 13 are surely locked. Thus, the magnetic tape is prevented from being loosened, and it is possible to prevent the magnetic tape from getting twisted around a guide roller of the video deck when the video tape cassette 1 is loaded into the video deck. Furthermore, since the lower engagement ends 47 and 49 are restricted in position by the stopper pins 102 and 103, it is possible to avoid unusual deformation of the lower engagement ends 47 and 49, even if the slide body 22 makes further advance movement.

When the video tape cassette 1 is loaded into the video deck, a lock releasing pin (not illustrated) of the video deck enters the opening 26 of the hollow portion 24 through the pin insertion opening 106 of the cassette half 11. Thus, the lock releasing pin of the video deck pushes the inclined surface 27 (see FIG. 6), causing the slide body 22 to retreat by a certain distance against the pushing force exerted by the compressed spring 23. Thus, the lower engagement ends 47 and 49 of the lock-engagement members 40 and 41 are entirely drawn out from the teeth 18 and 19 of the reels 12 and 13, respectively, as shown with two-dot chain lines in FIG. 4. Thus, the reels 12 and 13 are released from being locked, and hence now rotatable.

Herein, the upper engagement ends 46 and 48 of the lock-engagement members 40 and 41 are engaged in the elongated holes 42 and 43 formed on the slide body 22 so that the upper engagement ends 46 and 48 are slidable in a direction in which the slide body makes sliding movement, the lock-engagement members 40 and 41 start to rotate after the slide body 22 has retreated by a certain distance.

Accordingly, when a certain period of time passes after the magnetic tape cassette 1 has been loaded in a cassette deck, the reels are released from being locked, which can prevent the magnetic tape from being loosened while the magnetic tape is being loaded.

As mentioned earlier, since the lock-engagement members 40 and 41 are made of metal having resiliency, it is possible to prevent the engagement ends 46 to 49 from being fatigued or deteriorated due to shock to be caused when fallen or due to long term unuse, the reels 12 and 13 are ensured to be locked. In addition, by winding the lock-engagement members at least once at a central portion thereof like a coil to form a hole as shown in FIGS. 8A and 8B, it is possible to maintain the resiliency to be high even if the lock-engagement members are small in size.

Furthermore, since the lock-engagement members 40 and 41 have certain resiliency, it is ensured that the lower engagement ends 47 and 49 are surely engaged between the teeth 18 and 19 of the reels 12 and 13, respectively, even if there is a dispersion in a distance of slide movement of the slide body 22. In addition, the resiliency of the lock-engagement members 40 and 41 makes it no longer necessary to prepare a spring for urging the lower engagement ends toward the reels 12 and 13, so that the number of assembly parts decreased. Thus, the video tape cassette can be readily assembled. Accordingly, the invention is suitably applied to a small-sized tape cassette.

In the above mentioned embodiment, the upper engagement ends 46 and 48 have different shapes from those of the lower engagement ends 47 and 49. However, it should be noted that the upper engagement ends 46 and 48 may have the same shapes as those of the lower engagement ends 47 and 49 when viewed with respect to a center of the coil portions 44 and 45. This eliminates restriction about orientation and top and bottom in assembling of the lock-engagement members 40 and 41, so that the number of assembly steps is decreased to facilitate the assembling.

In the above mentioned embodiment, the lock-engagement members 40 and 41 are wound at least once at a central portion thereof like a coil to form a hole, and the support members 100 and 101 are in the form of shafts over which the coil of the lock-engagement members 40 and 41 are configured. In an alternative, the lock-engagement members may be designed not to have such a hole. For instance, the lock-engagement members are designed to be bent at a central portion thereof, and there are formed on a cassette half a plurality of shaft-like members or ribs which are suitably bent for positioning the bending portions of the lock-engagement members for rotation.

As described above, in the magnetic tape cassette made in accordance with the present invention, the lock-engagement members made of metal having certain resiliency are rotatably supported with the standing shafts disposed in the vicinity of the slide body. One of the engagement ends of the lock-engagement members is engaged to the slide body, while the other engagement end is engaged to the teeth formed at a circumference of the reel with one of engagement ends of the lock-engagement members being engaged to the slide body.

Thus, in accordance with the invention, it is possible to prevent the engagement ends from being fatigued or deteriorated due to shocks received when the tape cassette is dropped or due to long term unuse or preservation, the reels are ensured to be locked. In addition, since the lock-engagement members have certain resiliency even if they are small in size, it is no longer necessary to prepare a spring for urging the engagement ends toward the reels. The number of assembly parts decreases hence to simplify the assembling. Accordingly, the invention can be suitably applied to a small-sized tape cassette.

What is claimed is:

1. A cassette for containing a magnetic tape therein, comprising:
    a cassette body;
    a pair of reels disposed rotatably in the cassette body for winding the magnetic tape around the reels, each of the reels including a flange having a plurality of teeth formed at a circumference of the flange; and
    a reel locking assembly for engaging the teeth of the flanges for preventing rotation of the reels, the reel locking assembly comprising:
        a slide body disposed between the reels, the slide body being slidably movable along a path between a reel-rotation-preventing position and a reel-rotation-allowing position;
        an urging member urging the slide body towards the reel-rotation-preventing position;
        a pair of support members each disposed on a respective side of the path of the slide body; and
        a pair of spring wire rod lock-engagement members, each disposed on a respective side of the path of the slide body, each having a coiled central portion which is supported rotatably by one of said pair of support members and two straight wire rod portions each extending outwardly from a respective end of the coiled central portion, each of said straight wire rod portions including an angled end portion at a free end thereof, one of said angled end portions of each said spring wire rod lock-engagement members comprising a first engagement end engaged to the slide body, the other one of said angled end portions of each said spring wire rod lock-engagement members comprising a second engagement end for engaging the teeth of one of the flanges.

2. The cassette of claim 1, wherein the slide body has an elongated hole extending in a direction parallel to the path of the slide body, and the first engagement end of one of said spring wire rod lock-engagement members is slidingly fitted into the elongated hole to delay a motion of the one of said spring wire rod lock-engagement members relative to a movement of the slide body from the reel-rotation-preventing position to the reel-rotation-allowing position.

3. The cassette as set forth in claim 2, wherein each said first engagement end has the same configuration as each said second engagement end.

4. The cassette as set forth in claim 1, wherein each said first engagement end has the same configuration as each said second engagement end.

* * * * *